United States Patent
Ito

(10) Patent No.: US 9,337,654 B2
(45) Date of Patent: May 10, 2016

(54) POWER STORAGE DEVICE AND METHOD FOR OPERATING POWER STORAGE DEVICE

(71) Applicant: NGK Insulators, Ltd., Nagoya-Shi (JP)

(72) Inventor: Yoshiyuki Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 379 days.

(21) Appl. No.: 14/017,853

(22) Filed: Sep. 4, 2013

(65) Prior Publication Data

US 2014/0008980 A1    Jan. 9, 2014

Related U.S. Application Data

(63) Continuation of application No. PCT/JP2012/058877, filed on Apr. 2, 2012.

(30) Foreign Application Priority Data

Apr. 11, 2011    (JP) .................................. 2011-086963

(51) Int. Cl.
| | |
|---|---|
| *H02J 1/10* | (2006.01) |
| *H02J 3/32* | (2006.01) |
| *H02J 7/00* | (2006.01) |
| *H01M 10/44* | (2006.01) |
| *H01M 10/657* | (2014.01) |
| *H01M 10/66* | (2014.01) |
| *H02J 1/00* | (2006.01) |

(Continued)

(52) U.S. Cl.
CPC ............... *H02J 1/10* (2013.01); *H01M 10/448* (2013.01); *H01M 10/657* (2015.04); *H01M 10/66* (2015.04); *H02J 3/32* (2013.01); *H02J 7/0081* (2013.01); *H01M 10/3909* (2013.01); *H01M 10/627* (2015.04); *Y10T 307/391* (2015.04)

(58) Field of Classification Search
CPC .......................................................... H02J 1/00
USPC .......................................................... 307/66
See application file for complete search history.

(56) References Cited

U.S. PATENT DOCUMENTS

2010/0047672 A1    2/2010   Tamakoshi
2011/0278930 A1    11/2011  Yasutomi et al.

FOREIGN PATENT DOCUMENTS

| EP | 1 143 595 A2 | 10/2001 |
|---|---|---|
| EP | 1 156 573 A2 | 11/2001 |

(Continued)

OTHER PUBLICATIONS

Extended European Search Report (Application No. 12771332.9) dated May 13, 2015.

(Continued)

*Primary Examiner* — Robert Deberadinis
(74) *Attorney, Agent, or Firm* — Burr & Brown, PLLC

(57) ABSTRACT

A sodium-sulfur battery belongs to each of a plurality of operation units. A first power consuming body and a second power consuming body are electrically connected to the grid. The first power consuming body belongs to each of the plurality of operation units, and the second power consuming body does not belong to the operation unit. One of the first power consuming body and the second power consuming body may be omitted. Rank is given to each of the plurality of operation units. The ranks become higher as the remaining capacity of the sodium-sulfur batteries belonging to the operation unit becomes greater. When the stand-alone operation is started, one operation unit of the highest rank is selected, and the sodium-sulfur battery belonging to the operated operation unit is paralleled in to the grid.

15 Claims, 8 Drawing Sheets

(51) Int. Cl.
  *H01M 10/39* (2006.01)
  *H01M 10/627* (2014.01)

(56) References Cited

FOREIGN PATENT DOCUMENTS

| JP | 09-037477 | A1 | 2/1997 |
| JP | 2001-186677 | A1 | 7/2001 |
| JP | 2007-195348 | A1 | 8/2007 |
| JP | 2010-051074 | A1 | 3/2010 |
| WO | 2008/151659 | A2 | 12/2008 |
| WO | 2010/058460 | A1 | 5/2010 |

OTHER PUBLICATIONS

International Search Report dated Apr. 24, 2012.

POWER STORAGE DEVICE AND METHOD FOR OPERATING POWER STORAGE DEVICE

TECHNICAL FIELD

The present invention relates to a power storage device and a method for operating a power storage device.

BACKGROUND ART

A sodium-sulfur battery is used in a power storage device that supplies power to a power grid network and that receives power from the power grid network.

The sodium-sulfur battery is a secondary battery that operates at high temperatures. Accordingly, in the power storage device in which the sodium-sulfur battery is used, the sodium-sulfur battery is heated by a heater. Further, the temperature inside the power storage device must be the temperature at which devices operate stably. Therefore, the temperature inside the power storage device is adjusted by an air conditioner.

The power for allowing the heater and the air conditioner to operate is supplied from the power grid network. Accordingly, when the power reception from the power grid network is shut off because of power failure, maintenance or the like, the power is not supplied to the heater and the air conditioner. When the power is not supplied to the heater and the air conditioner, the temperature of the sodium-sulfur battery drops, and the temperature inside the power storage device deviates from the temperature at which equipment operates stably.

When the temperature of the sodium-sulfur battery drops, depending on the state of charge of the sodium-sulfur battery, the sodium-sulfur battery tends to fail because of distortion of components or the like. Further, when the temperature inside the power storage device deviates from the temperature at which the equipment operates stably, the equipment tends to fail.

Patent Document 1 proposes a solution to the problem. Patent Document 1 proposes that the sodium-sulfur battery or the like supply power to the heater when the power reception from the power grid network is shut off.

PRIOR ART DOCUMENT

Patent Document

Patent Document 1: Japanese Patent Application Laid-Open No.2010-51074

SUMMARY OF THE INVENTION

Problems to be Solved by the Invention

However, with the power storage device of a large scale, the power required for maintaining the power storage device in the proper state is also great, and it is difficult to maintain the power storage device in the proper state for a long period when the power reception from the power grid network is shut off.

The present invention is made for solving the problem. An object of the present invention is to provide a power storage device that is maintained in the proper state for a long period even when the power reception is shut off and a method for operating the power storage device.

Means for Solving the Problems

The present invention is directed to a power storage device. First to sixth aspects of the present invention relate to the case where a power consuming body belongs to an operation unit, whereas a seventh aspect of the present invention relates to the case where the power consuming body does not belong to the operation unit.

In the first aspect of the present invention, a grid, a plurality of operation units, a shutoff detecting mechanism, a remaining capacity specifying section, a rank giving section, a selecting section, and a stand-alone operation executing section are provided.

The operation unit includes a sodium-sulfur battery, a parallel-in/off mechanism and a power consuming body. The parallel-in/off mechanism switches between a state where the sodium-sulfur battery is paralleled in to the grid and a state where the sodium-sulfur battery is paralleled off from the grid. The power consuming body is electrically connected to the grid. The shutoff detecting mechanism detects a power reception shutoff.

The remaining capacity specifying section specifies an index of a remaining capacity of the sodium-sulfur battery belonging to each of the plurality of operation units. The specified index of the remaining capacity is referred to, and the rank giving section gives rank to each of the plurality of operation units. The rank becomes higher as the remaining capacity of the sodium-sulfur battery belonging to each of the plurality of operation units becomes greater.

When the shutoff detecting mechanism detects the power reception shutoff, the selecting section selects the operation unit. The selected operation unit is the operation unit of the highest rank.

The stand-alone operation executing section controls the parallel-in/off mechanism, and executes a stand-alone operation when the power reception shutoff is detected. In the stand-alone operation, the parallel-in/off mechanism belonging to the selected operation unit parallels in the sodium-sulfur battery to the grid, and the parallel-in/off mechanism belonging to the not selected operation unit parallels off the sodium-sulfur battery from the grid.

The second aspect of the present invention adds a further matter to the first aspect of the present invention. In the second aspect of the present invention, an end-of-discharge detecting section is provided. While the stand-alone operation is being executed, the end-of-discharge detecting section refers to the index of the remaining capacity, to detect that the remaining capacity of the sodium-sulfur battery belonging to the selected operation unit is below a reference.

When it is detected that the remaining capacity of the sodium-sulfur battery belonging to the selected operation unit is below the reference while the stand-alone operation is being executed, the selecting section newly selects the operation unit. The newly selected operation unit is the operation unit of the highest rank excluding the already selected operation unit.

The third aspect of the present invention adds a further matter to the first or second aspect of the present invention. In the third aspect of the present invention, the power consuming body includes a heater that heats the sodium-sulfur battery.

The fourth aspect of the present invention adds a further matter to any one of the first to third aspects of the present invention. In the third aspect of the present invention, the above mentioned power consuming body is a first power consuming body, and a second power consuming body is provided. The second power consuming body is electrically connected to the grid.

The fifth aspect of the present invention adds a further matter to the fourth aspect of the present invention. In the fifth aspect of the present invention, the second power consuming body includes an air conditioning device that adjusts a temperature inside the power storage device.

The sixth aspect of the present invention adds a further matter to any one of the first to fifth aspects of the present invention. In the sixth aspect of the present invention, a failure detecting section is provided. The failure detecting section detects a failure in each of the plurality of operation units. The operation unit in which any failure is detected is given no rank by the rank giving section.

In the seventh aspect of the present invention, a grid, a power consuming body, a plurality of operation units, a shutoff detecting mechanism, a remaining capacity specifying section, a rank giving section, a selecting section, and a stand-alone operation executing section are provided.

The operation unit includes a sodium-sulfur battery and a parallel-in/off mechanism. The parallel-in/off mechanism switches between a state where the sodium-sulfur battery is paralleled in to the grid and a state where the sodium-sulfur battery is paralleled off from the grid. The power consuming body is electrically connected to the grid. The shutoff detecting mechanism detects a power reception shutoff.

The remaining capacity specifying section specifies an index of a remaining capacity of the sodium-sulfur battery belonging to each of the plurality of operation units. The specified index of the remaining capacity is referred to, and the rank giving section gives rank to each of the plurality of operation units. The rank becomes higher as the remaining capacity of the sodium-sulfur battery belonging to each of the plurality of operation units becomes greater.

When the shutoff detecting mechanism detects the power reception shutoff, the selecting section selects the operation unit. The selected operation unit is the operation unit of the highest rank.

The stand-alone operation executing section controls the parallel-in/off mechanism, and executes a stand-alone operation when the power reception shutoff is detected. In the stand-alone operation, the parallel-in/off mechanism belonging to the selected operation unit parallels in the sodium-sulfur battery to the grid, and the parallel-in/off mechanism belonging to the not selected operation unit parallels off the sodium-sulfur battery from the grid.

The eighth and ninth aspects of the present invention are each directed to a power storage device operating method.

Effects of the Invention

According to the first and eighth aspects of the present invention, when the power reception is shut off, power is supplied from the sodium-sulfur battery with high remaining capacity to the power consuming body, and power is supplied to the power consuming body for a long period. The power storage device is maintained in the proper state for a long period.

According to the second aspect of the present invention, even when it becomes difficult to supply power from the sodium-sulfur battery belonging to the selected operation unit, power is supplied from the sodium-sulfur battery belonging to the newly selected operation unit, whereby power supply to the power consuming body is continued; power is supplied to the power consuming body for a long period; and the power storage device is maintained in the proper state for a long period.

According to the third aspect of the present invention, the temperature of the sodium-sulfur battery is properly maintained.

According to the fourth aspect of the present invention, when the power reception is shut off, power is supplied from the sodium-sulfur battery with high remaining capacity to the second power consuming body, whereby power is supplied to the second power consuming body for a long period, and the power storage device is maintained in the proper state for a long period.

According to the fifth aspect of the present invention, the temperature inside the power storage device is properly maintained.

According to the sixth aspect of the present invention, in the case where the stand-alone operation is executed, power supply from the failed operation unit to the power consuming body is suppressed, and the stand-alone operation by a failure of the failed operation unit is suppressed.

According to the seventh and ninth aspect of the present invention, when the power reception is shut off, power is supplied from the sodium-sulfur battery with great remaining capacity to the power consuming body, whereby power is supplied to the power consuming body for a long period, and the power storage device is maintained in the proper state independently for a long period.

These and other objects, features, aspects and advantages of the present invention will become more apparent from the following detailed description of the present invention when taken in conjunction with the accompanying drawings.

EMBODIMENT FOR CARRYING OUT THE INVENTION (Overview of Idea)

Figure 1:
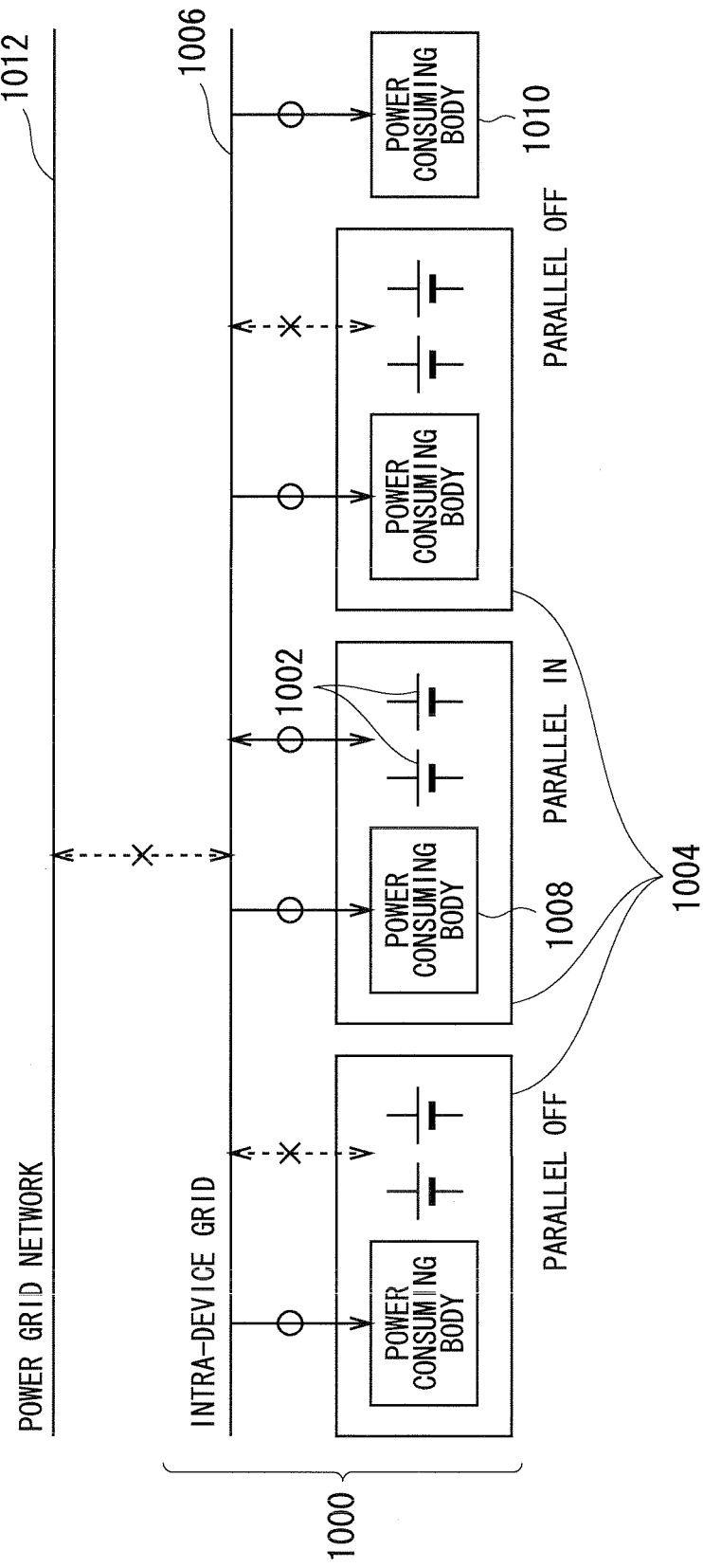
FIG. 1 is a schematic diagram showing an overview of a stand-alone operation.
Figure 2:
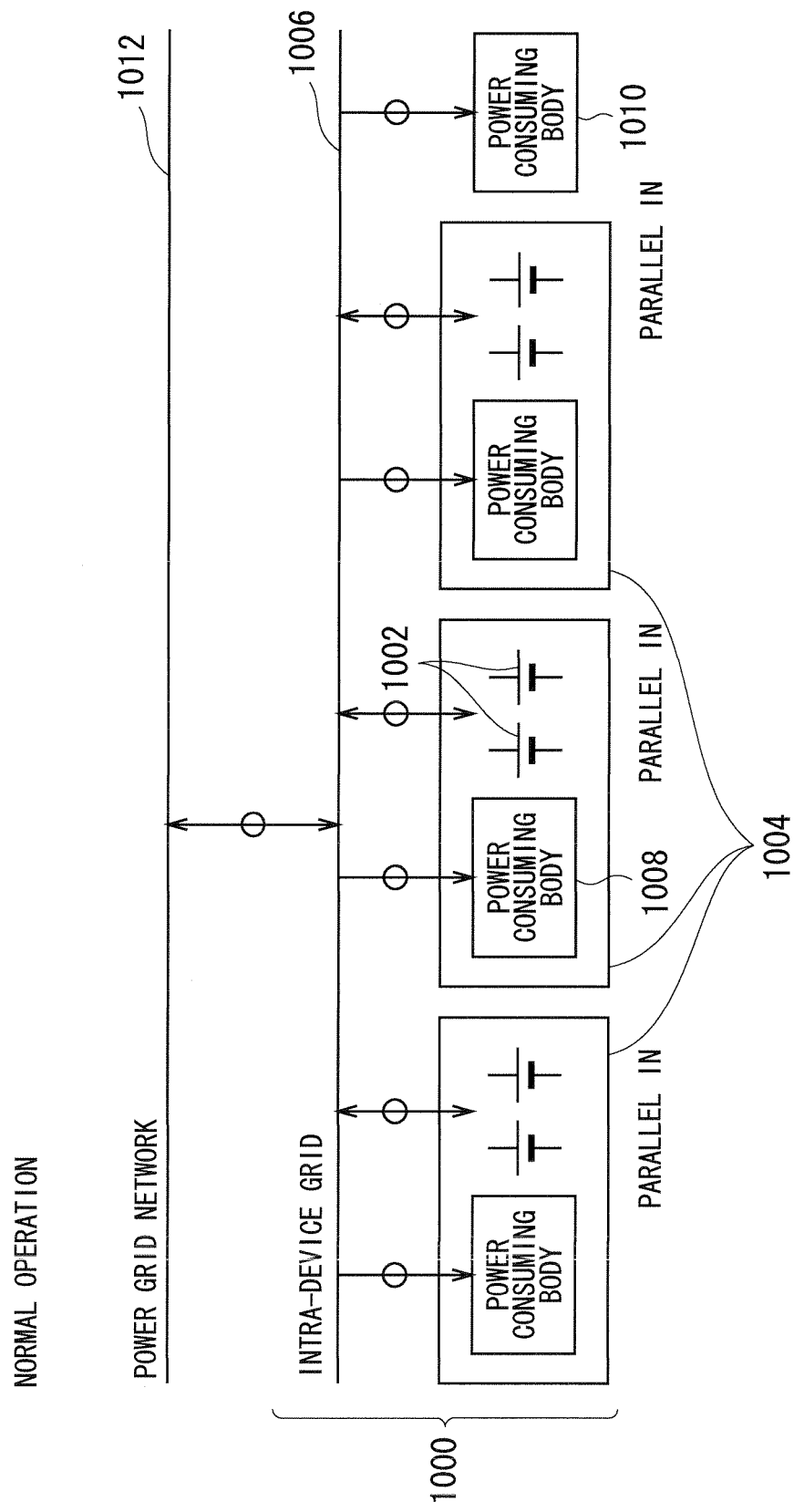
FIG. 2 is a schematic diagram showing an overview of a normal operation.

The schematic diagrams of FIGS. 1 and 2 show overviews of a stand-alone operation and a normal operation in a power storage device, respectively.

(Operation Unit)

As shown in FIGS. 1 and 2, in a power storage device 1000, a sodium-sulfur battery 1002 is in each of a plurality of operation units 1004.

The operation unit 1004 is a unit of the sodium-sulfur battery 1002 being paralleled in to an intra-device grid 1006 and paralleled off from the intra-device grid 1006. When two or more sodium-sulfur batteries 1002 belong to one operation unit 1004, the two or more sodium-sulfur batteries 1002 are simultaneously paralleled in to the intra-device grid 1006, or simultaneously paralleled off from the intra-device grid 1006. The event in which one of the two or more sodium-sulfur batteries 1002 is paralleled in to the intra-device grid 1006 and simultaneously the other one is paralleled off from the intra-device grid 1006 will not occur. Though the designation of the operation unit 1004 varies among business entities, the designation "battery unit" is representatively used.

Representatively, each of the plurality of operation units 1004 is stored in a housing. Two or more operation units 1004 may be stored in one housing; the operation unit 1004 may not be stored in a housing.

(Power Consuming Body)

A first power consuming body 1008 is in each of the plurality of operation units 1004. A second power consuming body 1010 is in the outside of the plurality of operation units 1004. The first power consuming bodies 1008 and the second power consuming body 1010 are electrically connected to the intra-device grid 1006. Power is supplied from the intra-device grid 1006 to the first power consuming bodies 1008 and the second power consuming body 1010. The first power consuming bodies 1008 and the second power consuming body 1010 consume power to operate. Either the first power consuming bodies 1008 or the second power consuming body 1010 can be omitted. Part of the plurality of first power consuming bodies 1008 may be omitted.

(Changeover Between Normal Operation and Stand-Alone Operation)

When power reception from the power grid network 1012 is not shut off, as shown in FIG. 2, the normal operation is executed; and when the power reception from the power grid network 1012 is shut off, as shown in FIG. 1, the stand-alone operation is executed.

(Normal Operation)

As shown in FIG. 2, when the normal operation is executed, the plurality of operation units 1004 are all operated. Only part of the plurality of operation units 1004 may be operated. The sodium-sulfur battery 1002 belonging to the operated operation unit 1004 is paralleled in to the intra-device grid 1006, and enters the state where it can exchange power with the intra-device grid 1006. The power discharged from the paralleled-in sodium-sulfur battery 1002 is transmitted to the power grid network 1012. The power received from the power grid network 1012 is charged into the sodium-sulfur battery 1002 paralleled in to the intra-device grid 1006. Further, power is supplied from the power grid network 1012 to the first power consuming bodies 1008 and the second power consuming body 1010. Power may be supplied from the sodium-sulfur battery 1002 to the first power consuming bodies 1008 and the second power consuming body 1010.

(Stand-Alone Operation)

As shown in FIG. 1, when the stand-alone operation is executed, one operation unit 1004 is operated. The sodium-sulfur battery 1002 belonging to the operated operation unit 1004 is paralleled in the intra-device grid 1006, and enters the state where it can exchange power with the intra-device grid 1006. The sodium-sulfur battery 1002 belonging to the not operated operation unit 1004 is paralleled off from the intra-device grid 1006, and enters the state where it cannot exchange power with the intra-device grid 1006.

Power is supplied from the paralleled-in sodium-sulfur battery 1002 to the first power consuming bodies 1008 and the second power consuming body 1010.

In the stand-alone operation, two or more operation units 1004 are not operated simultaneously. The event in which the sodium-sulfur battery 1002 belonging to one operation unit 1004 becomes the supply source of power while the sodium-sulfur battery 1002 included in the other operation unit 1004 becoming the receiver of the power will not occur, and the operation of the power storage device 1000 becomes stable.

(Operated Operation Unit)

Each of the plurality of operation units 1004 is given rank. The rank becomes higher as the remaining capacity of the sodium-sulfur battery 1002 belonging to the operation unit 1004 becomes greater.

When the stand-alone operation is started, one operation unit 1004 of the highest rank is selected, and the selected operation unit 1004 is operated.

After the stand-alone operation is started, when the remaining capacity of the sodium-sulfur battery 1002 belonging to the operated operation unit 1004 becomes small, the operation unit 1004 of the highest rank excluding the already selected operation unit 1004 is newly selected. The operation of the newly selected operation unit 1004 is started, and the operation of the operation unit 1004 with the sodium-sulfur battery 1002 with small remaining capacity is ended.

(Overview of Desirable Embodiment of Power Storage Device)

Figure 3:
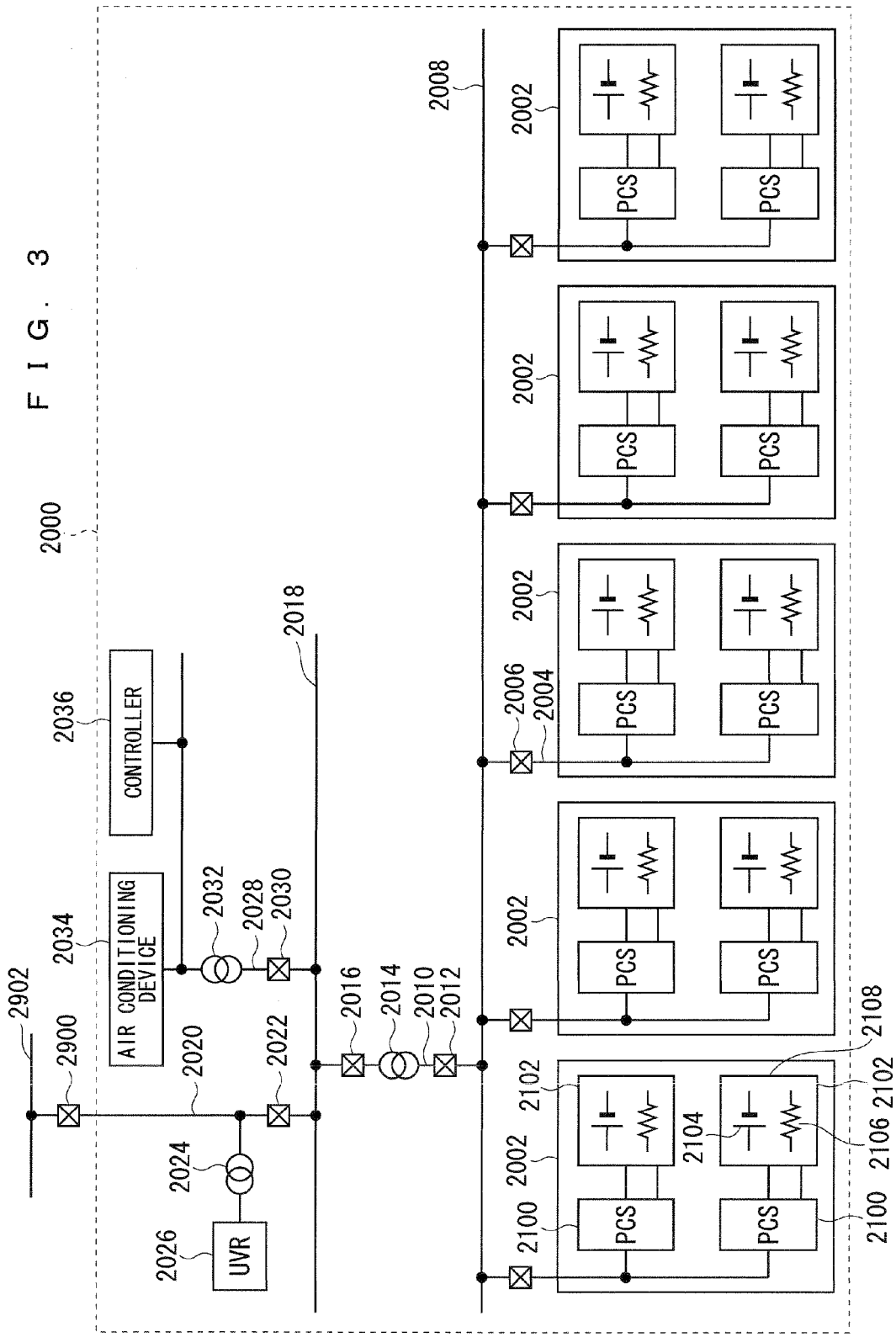
FIG. 3 is a block diagram of an electric power system of the power storage device.
Figure 4:
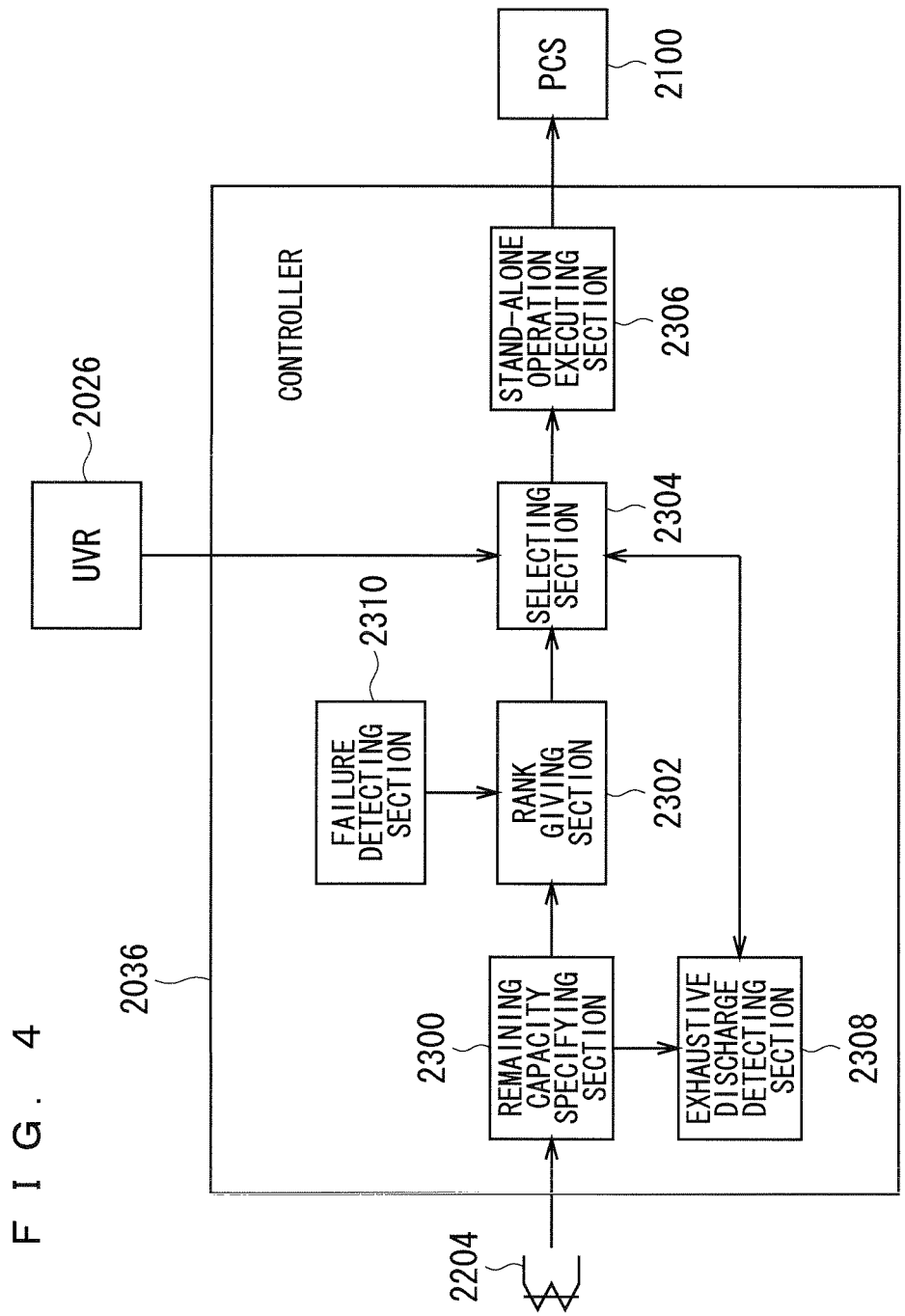
FIG. 4 is a block diagram of a control system of the power storage device.

The block diagrams of FIGS. 3 and 4 show a desirable embodiment of the power storage device. The block diagram of FIG. 3 shows an electric power system and the block diagram of FIG. 4 shows a control system.

As shown in FIG. 3, a power storage device 2000 includes battery units 2002, power transmission paths 2004 for charging and discharging, breakers 2006 for shutting off charging and discharging, a low-voltage side grid 2008, a power transmission path 2010 for connection between grids, a low-voltage side breaker 2012 for shutting off connection between grids, a transformer 2014 for connection between grids, a high-voltage side breaker 2016 for shutting off connection between grids, a high-voltage side grid 2018, a transmission path 2020 for transmitting and receiving power, a breaker 2022 for shutting off transmitting and receiving power, an transformer 2024 for undervoltage relay, an undervoltage relay 2026, a power transmission path 2028 for supplying power, a breaker 2030 for shutting off supplying power, a transformer 2032 for supplying power, an air conditioning device 2034, and a controller 2036.

The number of battery units 2002 is not necessary five, and it may be two or more and four or less; or six or more.

The power transmission paths 2004 for charging and discharging and the breakers 2006 for shutting off charging and discharging are provided so as to correspond to the plurality of battery units 2002, respectively. Part of those constituents may be omitted. For example, all of or part of the breakers 2006 for shutting off charging and discharging, the low-voltage side breaker 2012 for shutting off connection between grids, the high-voltage side breaker 2016 for shutting off connection between grids and the breaker 2022 for shutting off transmitting and receiving power may be omitted. When an increase or reduction in voltage is not necessary, one of or both the transformer 2024 for undervoltage relay and the transformer 2032 for supplying power are omitted.

Depending on the voltage of a power grid network 2902, in some cases, the low-voltage side grid 2008 becomes the high-voltage side grid, whereas the high-voltage side grid 2018 becomes the low-voltage side grid. Depending on the voltage of the power grid network 2902, in some cases, the power transmission path 2010 for connection between grids is omitted, and the low-voltage side grid 2008 and the high-voltage side grid 2018 are integrated into one grid.

(Power reception from Power Grid Network and Power Transmission to Grid Network)

The power storage device 2000 is connected to the power grid network 2902 via a breaker 2900. The power storage device 2000 receives power from the power grid network 2902, and transmits power to the power grid network 2902.

The power storage device 2000 is used for compensating variations in demand and supply of power and the like. When the power storage device 2000 receives power, power is transmitted from the power grid network 2902 to the battery units 2002 via the transmission path 2020 for transmitting and receiving power, the high-voltage side grid 2018, the power transmission path 2010 for connection between grids, the low-voltage side grid 2008, and the power transmission paths 2004 for charging and discharging in order. When the power storage device 2000 transmits power, power is transmitted from the battery units 2002 to the power grid network 2902 via the power transmission paths 2004 for charging and discharging, the low-voltage side grid 2008, the power transmission path 2010 for connection between grids, the high-voltage side grid 2018, and the transmission path 2020 for transmitting and receiving power in order. The power storage device 2000 may be connected elsewhere other than the power grid network 2902.

(Air Conditioning Device and Controller)

The temperature inside the power storage device 2000 is adjusted by the air conditioning device 2034. Thus, the temperature inside the power storage device 2000 is maintained at the temperature at which the constituent devices of the power storage device 2000 stably operate. The constituent devices of the power storage device 2000 are controlled by the controller 2036. The air conditioning device 2034 and the controller 2036 are representative examples of the above-described second power consuming body 1010, and operate while consuming power. However, both or one of the air conditioning device 2034 and the controller 2036 may be provided to the battery unit 2002, to form the above-described first power consuming bodies 1008.

The second power consuming body 1010 other than the air conditioning device 2034 and the controller 2036 may be provided to the power storage device 2000. For example, illumination, communication devices or the like may be provided to the power storage device 2000.

(Overview of Battery Unit)

Each of the plurality of battery units 2002 includes DC/AC inverters (PCS) 2100 and battery modules 2102. PCS is the abbreviation for "Power Conditioning System" or the like, also known as "AC/DC converter" or the like.

During execution of the stand-alone operation, the constant voltage control is exerted by the PCS 2100. The voltage referred to for stabilizing the voltage generated by the PCS 2100 is the voltage of the low-voltage side grid 2008. The PCS 2100 controls the generating voltage such that the generating voltage matches up with the voltage of the low-voltage side grid 2008. The PCS 2100 converts a direct current discharged by a sodium-sulfur battery 2104 into an alternating current and supplies the alternating current to the low-voltage side grid 2008. Further, the PCS 2100 converts an alternating current supplied from the low-voltage side grid 2008 into a direct current to charge the sodium-sulfur battery 2104.

Two or more PCSs 2100 belonging to one battery unit 2002 are operated in parallel. Desirably, the number of the PCSs 2100 belonging to one battery unit 2002 is two. This is because, when the number of the PCSs 2100 is two, the charging-discharging performance of the battery unit 2002 improves more than in the case where the number of the PCSs 2100 is one. Further, when the number of the PCSs 2100 is two, the operation of the power storage device 2000 becomes more stable than in the case where the number of the PCSs 2100 is three or more. The reason why the operation of the power storage device 2000 becoming unstable when the number of the PCSs 2100 is three or more is because of individual difference in performance of the PCSs 2100. When three or more PCSs 2100 are operated in parallel, a slight difference in voltages generated by the PCSs 2100 may cause energy exchange between one battery unit 2002 and other battery unit 2002, whereby the normal parallel operation is not performed. That is, charging is performed from the sodium-sulfur batteries 2104 belonging to one battery unit 2002 to the sodium-sulfur batteries 2104 belonging to other battery unit 2002. In this state, even a minor load variation invites overcurrent and voltage shortage, whereby the power storage device 2000 may highly possibly stop.

(Battery Module)

In each battery module 2102, the sodium-sulfur battery 2104 and a heater 2106 are stored in a container 2108. The constituents other than the sodium-sulfur battery 2104 and the heater 2106 may be contained in the container 2108. Representatively, the sodium-sulfur battery 2104 and the heater 2106 are stored in the container 2108. The sodium-sulfur battery 2104 and the heater 2106 may be provided as being bare in the battery unit 2002. Though the sodium-sulfur battery 2104 is representatively an assembled battery, it may be a cell battery. During operation of the power storage device 2000, the sodium-sulfur battery 2104 is heated by the heater 2106, whereby the temperature of the sodium-sulfur battery 2104 is maintained at the temperature of 300° C. or more. The heater 2106 is a representative example of the above-described first power consuming body 1008, and consumes power to operate.

The first power consuming body 1008 other than the heater 2106 may be provided to the battery unit 2002. For example, a sensor, a controller or the like that consumes power to operate may be provided to the battery unit 2002.

(Changeover Between Normal Operation and Stand-Alone Operation)

The power storage device 2000 executes the normal operation when being connected to the power grid network 2902, and executes the stand-alone operation when not being connected to the power grid network 2902.

When the normal operation is executed, power is supplied from the power grid network 2902 to the heater 2106, the air conditioning device 2034 and the controller 2036. When the stand-alone operation is executed, power is supplied from the sodium-sulfur battery 2104 to the heater 2106, the air conditioning device 2034 and the controller 2036.

(Electrical Connection Inside Power Storage Device)

To the low-voltage side grid 2008, the plurality of battery units 2002 are electrically connected via the power transmission paths 2004 for charging and discharging, respectively. To each of the plurality of power transmission paths 2004 for charging and discharging connecting the low-voltage side grid 2008 and each of the plurality of battery units 2002, the breaker 2006 for shutting off charging and discharging is inserted.

Each of the plurality of power transmission paths 2004 for charging and discharging is electrically connected to the PCS 2100. To the PCS 2100, the battery module 2102 is electrically connected. Thus, the sodium-sulfur battery 2104 and the heater 2106 are electrically connected to the low-voltage side grid 2008 via the PCS 2100 and the power transmission path 2004 for charging and discharging. Further, the state where the sodium-sulfur battery 2104 is paralleled in to the low-voltage side grid 2008 and the state where the sodium-sulfur battery 2104 is paralleled off from the low-voltage side grid 2008 are changed over by the PCS 2100. The electrical connection path between the sodium-sulfur batteries 2104 and the low-voltage side grid 2008 and the electrical connection path between the heaters 2105 and the low-voltage side grid 2008 may be completely separated from each other. The parallel-in state and the parallel-off state may be changed over by any parallel-in/off mechanism other than the PCS 2100. In some cases, the term "turn-on" may be used instead of the term "parallel-in".

The number of battery module 2102 connected to one PCS 2100 may not be one but may be two or more.

The low-voltage side grid 2008 and the high-voltage side grid 2018 are electrically connected to each other by the power transmission path 2010 for connection between grids. In the power transmission path 2010 for connection between grids, the low-voltage side breaker 2012 for shutting off connection between grids, the transformer 2014 for connection between grids and the high-voltage side breaker 2016 for shutting off connection between grids are inserted.

The high-voltage side grid 2018 is electrically connected to the power grid network 2902 via the transmission path 2020 for transmitting and receiving power. In the transmission path 2020 for transmitting and receiving power, the breaker 2022 for shutting off transmitting and receiving power is inserted, and the undervoltage relay 2026 is electrically connected via the transformer 2024 for undervoltage relay. Further, to the high-voltage side grid 2018, the air conditioning device 2034 and the controller 2036 are electrically connected via the power transmission path 2028 for supplying power. In the power transmission path 2028 for supplying power, the breaker 2030 for shutting off supplying power and the transformer 2032 for supplying power are inserted.

Thus, the air conditioning device 2034 and the controller 2036 are electrically connected to the low-voltage side grid 2008 via the power transmission path 2028 for supplying power, the high-voltage side grid 2018 and the power transmission path 2010 for connection between grids. The electrical connection path between the air conditioning device 2034 and the controller 2036 and the low-voltage side grid 2008 may be changed. For example, the power transmission path 2028 for supplying power may be directly connected to the low-voltage side grid 2008.

The grid is one type of power transmission path that transmits power. To the grid, a single or a plurality of power supply source(s) or power supply receiver(s) is/are connected.

(Overview of PCS)

Figure 5:
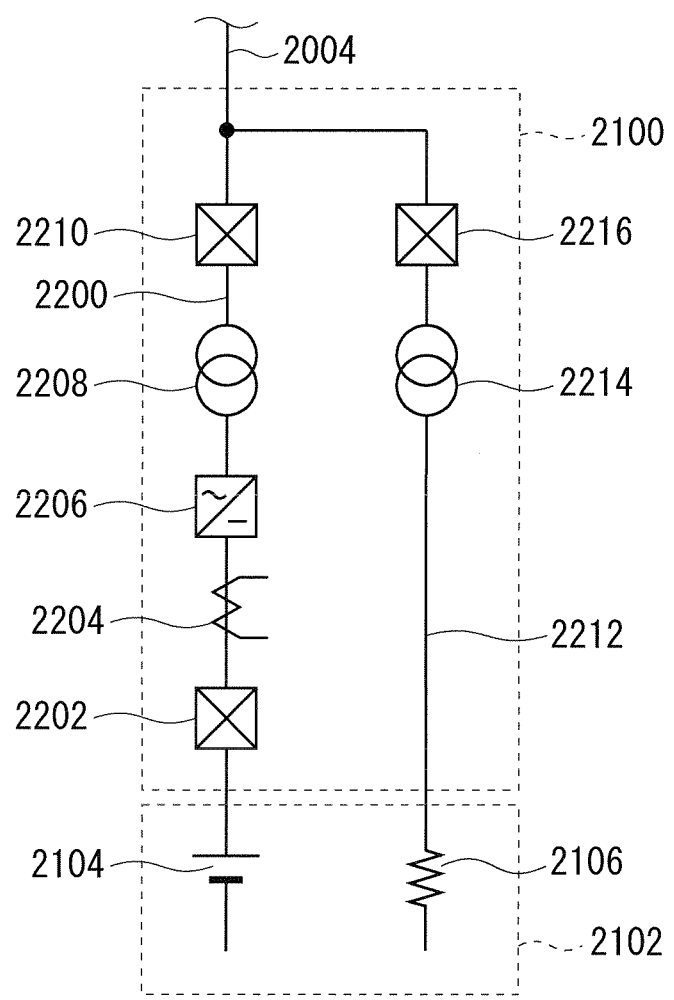
FIG. 5 is a block diagram of a PCS and a battery module.

FIG. 5 is a block diagram of the PCS and the battery module.

As shown in FIG. 5, the PCS 2100 includes a power transmission path 2200 for charging and discharging battery, a DC-side breaker 2202 for shutting off charging and discharging battery, a Hall effect current meter 2204, a bidirectional converter 2206, a transformer 2208 for charging and discharging battery, an AC-side breaker 2210 for shutting off charging and discharging battery, a power transmission path 2212 for supplying heater power, a transformer 2214 for supplying heater power, and a breaker 2216 for shutting off supplying heater power. Part of these constituents may be omitted. For example, both or one of the DC-side breaker 2202 for shutting off charging and discharging battery and the AC-side breaker 2210 for shutting off charging and discharging battery may be omitted. The breaker 2216 for shutting off supplying heater power may be omitted. In the case where the voltage on the AC side of the bidirectional converter 2206 matches up with the voltage of the low-voltage side grid 2008, the transformer 2208 for charging and discharging battery may be omitted. When the operating voltage of the heater 2106 matches up with the voltage of the low-voltage side grid 2008, the transformer 2214 for supplying heater power may be omitted. Part of these constituents may be provided outside of the PCS 2100. Any constituent other than these constituents may be provided inside of the PCS 2100.

The power transmission path 2200 for charging and discharging battery electrically connects the power transmission path 2004 for charging and discharging and the sodium-sulfur battery 2104 to each other. The power transmission path 2212 for supplying heater power electrically connects the power transmission path 2004 for charging and discharging and the heater 2106 to each other. In the power transmission path 2200 for charging and discharging battery, the DC-side breaker 2202 for shutting off charging and discharging battery, the Hall effect current meter 2204, the bidirectional converter 2206, the transformer 2208 for charging and discharging battery, and the AC-side breaker 2210 for shutting off charging and discharging battery are inserted. In the power transmission path 2212 for supplying heater power, the transformer 2214 for supplying heater power and the breaker 2216 for shutting off supplying heater power are inserted.

The power discharged from the sodium-sulfur battery 2104 is transmitted through the power transmission path 2200 for charging and discharging battery, and passes the DC-side breaker 2202 for shutting off charging and discharging battery, the Hall effect current meter 2204, the bidirectional converter 2206, the transformer 2208 for charging and discharging battery, and the AC-side breaker 2210 for shutting off charging and discharging battery in order. When the power passes through the bidirectional converter 2206, conversion from the direct current to the alternating current is performed. When the power passes through the transformer 2208 for charging and discharging battery, the voltage is raised.

The power charged to the sodium-sulfur battery 2104 is transmitted through the power transmission path 2200 for charging and discharging battery, and passes through the AC-side breaker 2210 for shutting off charging and discharging battery, the transformer 2208 for charging and discharging battery, the bidirectional converter 2206, the Hall effect current meter 2204, and the DC-side breaker 2202 for shutting off charging and discharging battery in order. When the power passes through the transformer 2208 for charging and discharging battery, the voltage is reduced. When the power passes through the bidirectional converter 2206, conversion from the alternating current to the direct current is performed.

The current flowing through the power transmission path 2200 for charging and discharging battery, that is, the current charging or discharging the sodium-sulfur battery 2104 is measured by the Hall effect current meter 2204. The charging-discharging current may be measured by any current meter of the type being different from the Hall effect current meter 2204.

When the PCS 2100 parallels in the sodium-sulfur battery 2104, the DC-side breaker 2202 for shutting off charging and discharging battery closes, whereby the power transmission path 2200 for charging and discharging battery enters the state where it can transmits power. When the PCS 2100 parallels off the sodium-sulfur battery 2104, the DC-side breaker 2202 for shutting off charging and discharging battery opens, whereby the power transmission path 2200 for charging and discharging battery enters the state where it cannot transmit power. Desirably, the DC-side breaker 2202 for shutting off charging and discharging battery opens or closes the power transmission path 2200 for charging and discharging battery. However, the AC-side breaker 2210 for shutting off charging and discharging battery may open or close the power transmission path 2200 for charging and discharging battery, or both the DC-side breaker 2202 for shutting off charging and discharging battery and the AC-side breaker 2210 for shutting off charging and discharging battery may open or close the power transmission path 2200 for charging and discharging battery.

The power supplied to the heater 2106 is transmitted through the power transmission path 2212 for supplying heater power, and passes through the breaker 2216 for shutting off supplying heater power and the transformer 2214 for supplying heater power in order. When the power passes through the transformer 2214 for supplying heater power, the voltage is reduced.

(Overview of Control System)

As shown in FIG. 4, the controller 2036 includes a remaining capacity specifying section 2300, a rank giving section 2302, a selecting section 2304, a stand-alone operation executing section 2306, an end-of-discharge detecting section 2308, and a failure detecting section 2310, to execute all or part of the operation of the power storage device 2000 after the power storage device 2000 is installed. These constituents are realized by the controller 2036 being a control-purpose computer executing an installed control-purpose program.

All or part of these constituents may be replaced by electronic circuits not having software such as an operational amplifier, a comparator and the like. All or part of the processes by these constituents may be replaced by manual works performed by human being.

(Remaining Capacity Specifying Section)

The remaining capacity specifying section 2300 acquires measurement values of the charging-discharging current from the Hall effect current meter 2204, integrates the measurement values of the charging-discharging current, and derives the index of remaining capacity of the sodium-sulfur battery 2104 belonging to each of the plurality of battery units 2002 from the summation value.

The manner of deriving the index of remaining capacity may be changed. For example, the measurement value of the charging-discharging current may be acquired from a current meter of a type different from the Hall effect current meter 2204. Measurement values of charging-discharging power and charging-discharging voltage may be acquired and the charging-discharging current may be calculated from the measurement values of the charging-discharging power and the charging-discharging voltage. A command value of the charging-discharging power to the bidirectional converter may be used in place of the measurement value of the charging-discharging power.

The index of the remaining capacity may be the remaining capacity itself, or it may be a quantity that shows one-to-one correspondence with the remaining capacity. For example, in the case where the rated capacity of the sodium-sulfur battery 2104 belonging to each of the plurality of battery units 2002 is same, a state of charge (SOC), which is the ratio of the remaining capacity to the rated capacity, can serve as the index.

(Rank Giving Section)

The rank giving section 2302 refers to the index of the remaining capacity specified by the remaining capacity specifying section 2300, and gives ranks to the battery units 2002. The ranks become higher as the remaining capacity of the sodium-sulfur battery 2104 belonging to the battery unit 2002 becomes greater.

However, the rank giving section 2302 does not give a rank to the battery unit 2002 in which failure is detected by the failure detecting section 2310, whose description will follow. Thus, in the case where the stand-alone operation is executed, power is suppressed from being supplied from the failed battery unit 2002 to the heater 2106, the air conditioning device 2034 and the controller 2036, whereby the stand-alone operation is prevented from being stopped due to failure of the battery units 2002.

(Selecting Section)

The selecting section 2304 selects the battery unit 2002 that is given the highest rank by the rank giving section 2302, when voltage drop of the transmission path 2020 for transmitting and receiving power is detected by the undervoltage relay 2026.

A power reception shutoff from the power grid network 2902 may be detected in a way other than voltage drop detected by the undervoltage relay 2026. For example, the power reception shutoff from the power grid network 2902 may be detected based on voltage drop detected by a voltmeter, which is independent of the undervoltage relay 2026. In the case where the power storage device 2000 receives an operation of requesting a power reception shutoff from the power grid network 2902, the power reception shutoff from the power grid network 2902 may be detected based on the detection of the operation.

The selecting section 2304 newly selects the battery unit 2002 that is given the highest rank by the rank giving section 2302 excluding the already selected battery unit 2002, when the end-of-discharge detecting section 2308, whose description will follow, detects that the remaining capacity of the sodium-sulfur battery 2104 belonging to the battery unit 2002 being selected is below a reference during execution of the stand-alone operation.

(End-of-Discharge Detecting Section)

During the stand-alone operation is being executed, the end-of-discharge detecting section 2308 refers to the index of the remaining capacity specified by the remaining capacity specifying section 2300, and detects that the remaining capacity of the sodium-sulfur battery 2104 belonging to the battery unit 2002 being selected by the selecting section 2304 is below the reference. The reference is, for example, the threshold value of the remaining capacity or the index thereof (the lower limit value).

(Failure Detecting Section)

The failure detecting section 2310 detects any failure in each of the plurality of battery units 2002. The failure can be detected by any manner. For example, abnormality is detected based on detection of an abnormal voltage, an abnormal current, deterioration of the sodium-sulfur batteries 2104 and the like.

(Stand-Alone Operation Executing Section)

The stand-alone operation executing section 2306 controls the PCSs 2100. The stand-alone operation executing section 2306 executes the stand-alone operation when the power reception shutoff from the power grid network 2902 is detected by the undervoltage relay 2026. In the stand-alone operation, the PCSs 2100 belonging to the battery unit 2002 selected by the selecting section 2304 are caused to parallel in the sodium-sulfur batteries 2104 belonging to the battery unit 2002 selected by the selecting section 2304 to the low-voltage side grid 2008, and the PCSs 2100 belonging to the battery unit 2002 not selected by the selecting section 2304 are caused to parallel off the sodium-sulfur batteries 2104 belonging to the battery unit 2002 not selected by the selecting section 2304 from the low-voltage side grid 2008.

Thus, when the power reception from the power grid network 2902 is shut off, power is supplied from the sodium-sulfur battery 2104 with high remaining capacity to the heaters 2106, the air conditioning device 2034 and the controller 2036, and power is supplied to the heaters 2106, the air conditioning device 2034 and the controller 2036 for a long period, whereby the power storage device 2000 is maintained in the proper state for a long period. For example, the temperature of the sodium-sulfur batteries 2104 is properly maintained by the heaters 2106; the temperature inside the power storage device 2000 is properly maintained by the air conditioning device 2034; and the power storage device 2000 is properly controlled by the controller 2036.

Further, even when it becomes difficult to supply power from the sodium-sulfur batteries 2104 belonging to the battery unit 2002 being selected, power is supplied from the sodium-sulfur batteries 2104 belonging to the newly selected battery unit 2002; the power supply to the heaters 2106, the air conditioning device 2034 and the controller 2036 is continued; whereby power is supplied to the heaters 2106, the air conditioning device 2034 and the controller 2036 for a long period, and the power storage device 2000 is maintained in the proper state for a long period.

(Operation Example)

The case in which the SOCs and the states of the sodium-sulfur batteries 2104 belonging to the battery units 2002a to 2002e and the ranks of the battery units 2002a to 2002e are as shown in Table 1 is discussed.

TABLE 1

|  | SOC | State | Rank |
| --- | --- | --- | --- |
| Battery unit 2002a | 70% | Dischargeable | 2 |
| Battery unit 2002b | 0% | Not dischargeable (end-of-discharge) | Exclude |
| Battery unit 2002c | 95% | Dischargeable | 1 |
| Battery unit 2002d | 50% | Dischargeable | 3 |
| Battery unit 2002e | 100% | Not dischargeable (major fault) | Exclude |

Figure 6:
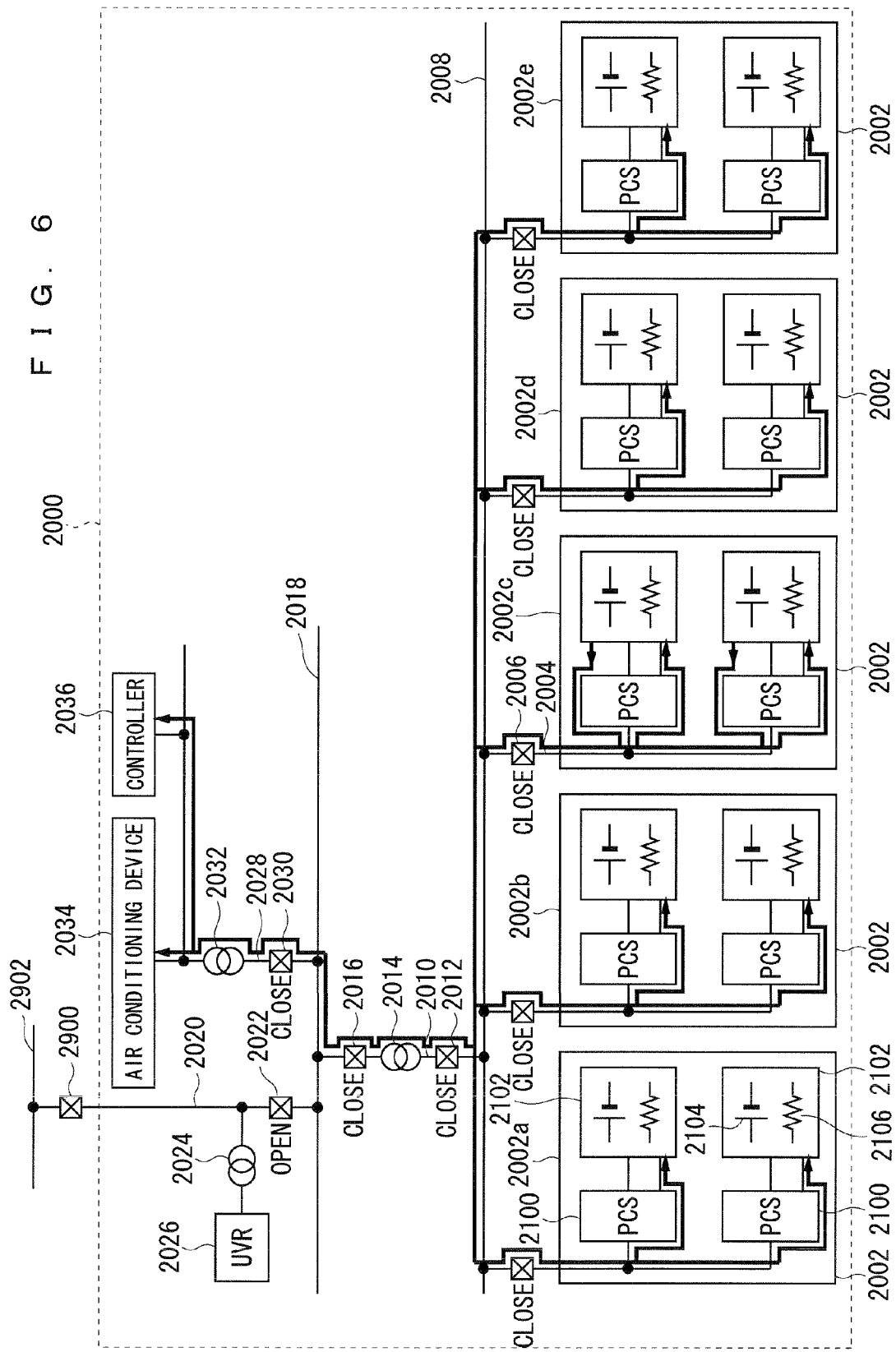
FIG. 6 is a block diagram of an electric power system of the power storage device.
Figure 7:
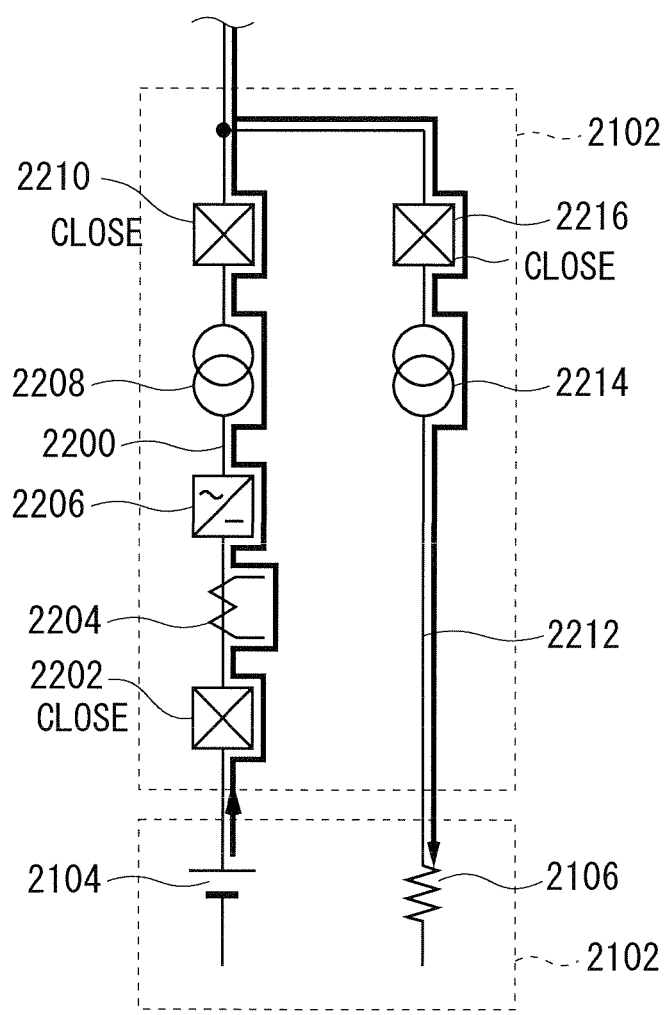
FIG. 7 is a block diagram of the PCS of a selected battery unit.
Figure 8:
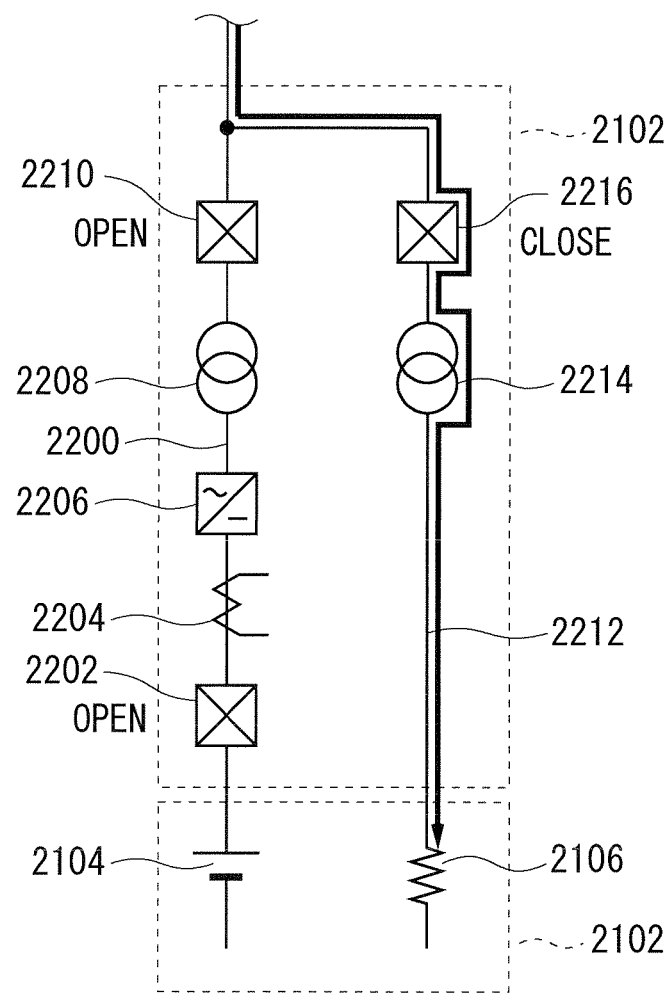
FIG. 8 is a block diagram of the PCS of a not selected battery unit.

In this case, when the power reception from the power grid network 2902 is shut off and the breaker 2022 for shutting off transmitting and receiving power opens, the battery unit 2002c of the highest rank is selected, and as shown in FIG. 6, power is supplied from the sodium-sulfur batteries 2104 belonging to the battery unit 2002c to the heaters 2106 belonging to the battery units 2002a to 2002e, the air conditioning device 2034 and the controller 2036. The breaker through which the power passes is closed. At this time, as shown in FIG. 7, the AC-side breaker 2210 for shutting off charging and discharging battery of the PCSs 2100 of the selected battery unit 2002c closes, and as shown in FIG. 8, the AC-side breaker 2210 for shutting off charging and discharging battery of each of the non-selected battery units 2002a, 2002b 2002d and 2002e opens.

Thereafter, when discharging of the sodium-sulfur batteries 2104 belonging to the battery unit 2002c progresses to reach end-of-discharge, the battery unit 2002a of the highest rank excluding the battery unit 2002c is newly selected, and from the sodium-sulfur batteries 2104 belonging to the battery unit 2002a, power is supplied to the heaters 2106 belonging to the battery units 2002b, 2002c, 2002d, and 2002e, the air conditioning device 2034 and the controller 2036.

While the invention has been shown and described in detail, the foregoing description is in all aspects illustrative and not restrictive. It is therefore understood that numerous modifications and variations can be devised without departing from the scope of the invention.

REFERENCE SIGNS LIST

1000 power storage device
1002 sodium-sulfur battery
1004 operation unit
2000 power storage device
2002 battery unit
2008 low-voltage side grid
2026 undervoltage relay
2104 sodium-sulfur battery
2106 heater

The invention claimed is:

1. A power storage device, comprising:
  a grid;
  a plurality of operation units, each including a sodium-sulfur battery, a parallel-in/off mechanism and a power consuming body, said parallel-in/off mechanism switching between a state where said sodium-sulfur battery is paralleled in to said grid and a state where said sodium-sulfur battery is paralleled off from said grid, said power consuming body being electrically connected to said grid;
  a shutoff detecting mechanism that detects a power reception shutoff;
  a remaining capacity specifying section that specifies an index of a remaining capacity of said sodium-sulfur battery belonging to each of said plurality of operation units;
  a rank giving section that refers to the index of the remaining capacity specified by said remaining capacity specifying section, to give rank to each of said plurality of operation units, the rank becoming higher as the remaining capacity of said sodium-sulfur battery belonging to each of said plurality of operation units becoming greater;
  a selecting section that selects a first operation unit given a highest rank by said rank giving section, when said shutoff detecting mechanism detects the power reception shutoff; and
  a stand-alone operation executing section that controls said parallel-in/off mechanism, and executes, when the power reception shutoff is detected by said shutoff detecting mechanism, a stand-alone operation in which said parallel-in/off mechanism belonging to said first operation unit selected by said selecting section is caused to parallel in said sodium-sulfur battery to said grid, and said parallel-in/off mechanism belonging to a second operation unit not selected by said selecting section is caused to parallel off said sodium-sulfur battery from said grid.

2. The power storage device according to claim 1, further comprising:
  an end-of-discharge detecting section that refers to the index of the remaining capacity specified by said remaining capacity specifying section while said stand-alone operation is being executed, to detect that the remaining capacity of said sodium-sulfur battery belonging to said first operation unit being selected by said selecting section is below a reference, wherein
  said selecting section newly selects a third operation unit given the highest rank by said rank giving section excluding said first operation unit when said end-of-discharge detecting section detects that the remaining capacity of said sodium-sulfur battery belonging to said first operation unit being selected is below the reference while said stand-alone operation is being executed.

3. The power storage device according to claim 2, wherein said power consuming body is a first power consuming body, the power storage device further comprising
  a second power consuming body that is electrically connected to said grid.

4. The power storage device according to claim 3, wherein said second power consuming body includes an air conditioning device that adjusts a temperature inside said power storage device.

5. The power storage device according to claim 2, further comprising
a failure detecting section that detects a failure in each of said plurality of operation units, wherein
said rank giving section gives no rank to a fourth operation unit in which the failure is detected by said failure detecting section.

6. The power storage device according to claim 1, wherein said power consuming body includes a heater that heats said sodium-sulfur battery.

7. The power storage device according to claim 6, wherein said power consuming body is a first power consuming body, the power storage device further comprising
a second power consuming body that is electrically connected to said grid.

8. The power storage device according to claim 7, wherein said second power consuming body includes an air conditioning device that adjusts a temperature inside said power storage device.

9. The power storage device according to claim 6, further comprising
a failure detecting section that detects a failure in each of said plurality of operation units, wherein
said rank giving section gives no rank to a fourth operation unit in which the failure is detected by said failure detecting section.

10. The power storage device according to claim 1, wherein said power consuming body is a first power consuming body, the power storage device further comprising
a second power consuming body that is electrically connected to said grid.

11. The power storage device according to claim 10, wherein
said second power consuming body includes an air conditioning device that adjusts a temperature inside said power storage device.

12. The power storage device according to claim 1, further comprising
a failure detecting section that detects a failure in each of said plurality of operation units, wherein
said rank giving section gives no rank to a fourth operation unit in which the failure is detected by said failure detecting section.

13. A power storage device, comprising:
a grid;
a power consuming body that is electrically connected to said grid;
a plurality of operation units each including a sodium-sulfur battery and a parallel-in/off mechanism, said parallel-in/off mechanism switching between a state where said sodium-sulfur battery is paralleled in to said grid and a state where said sodium-sulfur battery is paralleled off from said grid;
a shutoff detecting mechanism that detects a power reception shutoff;
a remaining capacity specifying section that specifies an index of a remaining capacity of said sodium-sulfur battery belonging to each of said plurality of operation units;
a rank giving section that refers to the index of the remaining capacity specified by said remaining capacity specifying section, to give rank to each of said plurality of operation units, the rank becoming higher as the remaining capacity of said sodium-sulfur battery belonging to each of said plurality of operation units becoming greater;
a selecting section that selects a first operation unit given a highest rank by said rank giving section, when said shutoff detecting mechanism detects the power reception shutoff; and
a stand-alone operation executing section that controls said parallel-in/off mechanism, and executes, when the power reception shutoff is detected by said shutoff detecting mechanism, a stand-alone operation in which said parallel-in/off mechanism belonging to said first operation unit selected by said selecting section is caused to parallel in said sodium-sulfur battery to said grid, and said parallel-in/off mechanism belonging to a second operation unit not selected by said selecting section is caused to parallel off said sodium-sulfur battery from said grid.

14. A power storage device operating method, comprising:
(a) a step of installing a power storage device including a grid and a plurality of operation units, said plurality of operation units each including a sodium-sulfur battery, a parallel-in/off mechanism and a power consuming body, said parallel-in/off mechanism switching between a state where said sodium-sulfur battery is paralleled in to said grid and a state where said sodium-sulfur battery is paralleled off from said grid in each of said plurality of operation units, and said power consuming body being electrically connected to said grid in each of said plurality of operation units;
(b) a step of detecting a power reception shutoff;
(c) a step of specifying an index of a remaining capacity of said sodium-sulfur battery belonging to each of said plurality of operation units;
(d) a step of referring to the index of the remaining capacity specified in said step (c), to give rank to each of said plurality of operation units, the rank becoming higher as the remaining capacity of said sodium-sulfur battery belonging to each of said plurality of operation units becoming greater;
(e) a step of selecting a first operation unit given a highest rank in said step (d), when the power reception shutoff is detected in step (b); and
(f) a step of controlling said parallel-in/off mechanism, and executing, when the power reception shutoff is detected in said step (b), a stand-alone operation in which said parallel-in/off mechanism belonging to said first operation unit selected in said step (e) is caused to parallel in said sodium-sulfur battery to said grid, and said parallel-in/off mechanism belonging to second operation unit not selected in said step (e) is caused to parallel off said sodium-sulfur battery from said grid.

15. A power storage device operating method, comprising:
(a) a step of installing a power storage device including a grid, a power consuming body and a plurality of operation units, said plurality of operation units each includes a sodium-sulfur battery and a parallel-in/off mechanism, said parallel-in/off mechanism switching between a state where said sodium-sulfur battery is paralleled in to said grid and a state where said sodium-sulfur battery is paralleled off from said grid in each of said plurality of operation units, and said power consuming body being electrically connected to said grid;
(b) a step of detecting a power reception shutoff;
(c) a step of specifying an index of a remaining capacity of said sodium-sulfur battery belonging to each of said plurality of operation units;

(d) a step of referring to the index of the remaining capacity specified in said step (c), to give rank to each of said plurality of operation units, the rank becoming higher as the remaining capacity of said sodium-sulfur battery belonging to each of said plurality of operation units becoming greater;

(e) a step of selecting a first operation unit given a highest rank in said step (d), when the power reception shutoff is detected in step (b); and (f) a step of controlling said parallel-in/off mechanism, and executing, when the power reception shutoff is detected in said step (b), a stand-alone operation in which said parallel-in/off mechanism belonging to said first operation unit selected in said step (e) is caused to parallel in said sodium-sulfur battery to said grid, and said parallel-in/off mechanism belonging to a second operation unit not selected in said step (e) is caused to parallel off said sodium-sulfur battery from said grid.

* * * * *